(12) United States Patent
Wang (10) Patent No.: US 11,881,632 B2
(45) Date of Patent: Jan. 23, 2024

(54) ANTENNA ARRAY APPLIED TO OPTICAL PHASED ARRAY, OPTICAL PHASED ARRAY, AND LIDAR

(71) Applicant: SUTENG INNOVATION TECHNOLOGY CO., LTD., Shenzhen (CN)

(72) Inventor: Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 198 days.

(21) Appl. No.: 17/568,755

(22) Filed: Jan. 5, 2022

(65) Prior Publication Data

US 2022/0302585 A1 Sep. 22, 2022

Related U.S. Application Data

(63) Continuation of application No. PCT/CN2019/095468, filed on Jul. 10, 2019.

(51) Int. Cl.
*H01Q 3/26* (2006.01)
*H01Q 15/00* (2006.01)

(52) U.S. Cl.
CPC .......... *H01Q 3/2676* (2013.01); *H01Q 3/267* (2013.01); *H01Q 15/0033* (2013.01)

(58) Field of Classification Search
CPC .. H01Q 3/2676; H01Q 3/267; H01Q 15/0033; G02B 6/1228; G02B 6/14;
(Continued)

(56) References Cited

U.S. PATENT DOCUMENTS 9,151,894 B2 10/2015 Okano et al.
10,326,526 B2 6/2019 Ashrafi
(Continued)

FOREIGN PATENT DOCUMENTS

CN 106908776 A 6/2017
CN 108646430 A 10/2018
(Continued)

OTHER PUBLICATIONS

European Search Report issued in corresponding European application No. 19937031.3, dated Jun. 9, 2022, 16 pages.
(Continued)

*Primary Examiner* — Awat M Salih
(74) *Attorney, Agent, or Firm* — BAYES PLLC (57) ABSTRACT

Embodiments of the present disclosure disclose an antenna array applied to an optical phased array, the optical phased array, and a LiDAR. The antenna array includes N phase compensation groups and N antenna groups, where each phase compensation group includes M phase compensation units, and each antenna group includes M antenna units, and where N and M are positive integers. An input end of a phase compensation unit in the phase compensation group is configured to receive an optical signal. An output end is connected to an antenna unit in the antenna group, is configured to transmit the received optical signal to the antenna unit, and performs phase compensation on the optical signal based on a phase shift caused by the antenna unit. The antenna unit is configured to transmit the optical signal.

7 Claims, 4 Drawing Sheets

(58) Field of Classification Search
CPC ... G02B 27/0087; G01S 7/4817; G01S 7/497; G01S 7/4814; G01S 7/4815; G01S 7/484; G01S 7/4911; G01S 17/08
See application file for complete search history.

(56) References Cited

U.S. PATENT DOCUMENTS

| | | |
|---|---|---|
| 2007/0211995 A1 | 9/2007 | Christensen |
| 2018/0069631 A1 | 3/2018 | Ashrafi |
| 2021/0088569 A1* | 3/2021 | Tang ..................... H01Q 3/267 |

FOREIGN PATENT DOCUMENTS

| | | |
|---|---|---|
| CN | 108957900 A | 12/2018 |
| CN | 109991582 A | 7/2019 |

OTHER PUBLICATIONS

Sun Jie et al., "Large-Scale Silicon Photonic Circuits for Optical Phased Arrays", IEEE Journal of Selected Topics in Quantum Electronics, IEEE, USA, vol. 20, No. 4, Nov. 28, 2013, 15 pages.
International Search Report issued in corresponding international application No. PCT/CN2019/095468, dated Mar. 27, 2020, 4 pages.
First Office Action issued in related Chinese application No. 201980002799.9, dated Jul. 3, 2020, 7 pages.

\* cited by examiner

ANTENNA ARRAY APPLIED TO OPTICAL PHASED ARRAY, OPTICAL PHASED ARRAY, AND LIDAR

CROSS-REFERENCE TO RELATED APPLICATION

The present application is a continuation of International Application No. PCT/CN2019/095468, filed on Jul. 10, 2019, which is incorporated herein by reference in its entirety.

TECHNICAL FIELD

The present disclosure relates to the technical field of LiDAR, and more specifically, to an antenna array applied to an optical phased array, the optical phased array, and a LiDAR.

BACKGROUND

An optical phased array is an important part of an all-solid-state LiDAR system and has the advantages of complete solid-state, high reliability, small size, and convenient control, or the like. The optical phased array can be realized by an integrated optoelectronic technology. An existing antenna array includes a silicon-on-insulator (SOI) material, a silicon nitride material, a III-V material, or the like. Since a silicon-based optical phased array based on the SOI material can utilize a mature microelectronic complementary metal oxide semiconductor (CMOS) process platform, the silicon-based optical phased array based on the SOI material has received great attention from the industry in recent years.

Generally, the optical phased array includes an optical splitter, a tunable phase shifter, a connection waveguide, and an antenna transmitting unit. An input light can be divided into light in an equal proportion or light in an unequal proportion through the optical splitter. After the light passes through the tunable phase shifter, phases of the light are changed. After passing through a series of connection waveguides, the light is finally launched into a free space in the antenna transmitting unit.

The edge-emitting antenna has a wide waveguide at an edge of a chip, and light can be properly confined in the waveguide. When the light reaches the edge of the chip for transmission into free space, a significant reflection phenomenon immediately occurs due to a sudden change in a refractive index, which severely affects transmission efficiency of this antenna. Therefore, how to improve transmission efficiency of the edge-emitting antenna is a problem that urgently needs to be resolved in the industry.

SUMMARY

In view of the foregoing problem, embodiments of the present disclosure provide an antenna array applied to an optical phased array, the optical phased array, and a LiDAR, to resolve all or at least a part of the foregoing problem.

According to an aspect of the present disclosure, an antenna array applied to an optical phased array is provided and includes N phase compensation groups and N antenna groups, where each phase compensation group includes M phase compensation units, and each antenna group includes M antenna units, and where N and M are positive integers. An input end of a phase compensation unit in the phase compensation group is configured to receive an optical signal. An output end is connected to an antenna unit in the antenna group, is configured to transmit the received optical signal to the antenna unit, and performs phase compensation on the optical signal based on a phase shift caused by the antenna unit. The antenna unit is configured to transmit the optical signal.

Optionally, the antenna unit includes a waveguide-based mode converter changing gradually from a first width to a narrower second width. The antenna unit is configured to gradually expand a light spot in the waveguide for emission from a tip end.

Optionally, the phase compensation unit includes a first mode converter whose width gradually changes from a first width to a third width, and a second mode converter whose width gradually changes from the third width to the first width, an output end of the first mode converter is connected to an input end of the second mode converter, and an output end of the second mode converter is connected to the antenna unit.

Optionally, the third width is related to the second width of the antenna unit connected to the output end of the second mode converter, and to a production process of the antenna array.

Optionally, in any phase compensation group, in response to that any antenna unit in any antenna group causes a phase shift of θ, the phase compensation unit whose output terminal is connected to the antenna unit adjusts a difference between the first width and the third width, so that the phase compensation unit causes a phase shift of −θ, where θ represents a phase change.

Optionally, a first width wj of any phase compensation unit in the phase compensation group is 300 nm to 500 nm, and a third width wjp is wj±200 nm.

Optionally, a length of any phase compensation unit is 1 μm to 50 μm, and a length of any antenna unit is 1 μm to 50 μm.

According to another aspect of the present disclosure, an optical phased array is provided and includes an optical signal output unit, a waveguide unit, and the foregoing antenna array applied to an optical phased array; the optical signal output unit is configured to output N×M modulated optical signals; and the waveguide unit includes N×M waveguide pipes and is configured to transmit the N×M modulated optical signals to an antenna unit for transmitting the optical signals.

Optionally, the optical signal output unit includes an optical splitter and a phase shifter connected to the optical splitter, and the optical splitter is configured to split input light; and the phase shifter is configured to shift a phase of light split by the optical splitter and finally output N×M optical signals with different phases.

According to another aspect of the present disclosure, a LiDAR is provided and includes the foregoing optical phased array, a light receiving unit, and a ranging unit.

According to still another aspect of the present disclosure, an intelligent apparatus is provided and includes the foregoing LiDAR.

Consistent with some embodiments of the present disclosure, the antenna array applied to the optical phased array is provided and includes the N phase compensation groups and the N antenna groups, where each phase compensation group includes the M phase compensation units, and each antenna group includes the M antenna units, and where N and M are positive integers. The input end of the phase compensation unit in the phase compensation group is configured to receive the optical signal. The output end is connected to the antenna unit in the antenna group, is configured to transmit the received optical signal to the antenna unit, and performs phase compensation on the optical signal based on the phase shift caused by the antenna unit. The antenna unit is configured to transmit the optical signal. Therefore, reducing the width of the antenna unit can enlarge a size of the light spot emitted by the antenna, thereby reducing reflection from an ambient environment and improving transmission efficiency. A phase difference caused by different antenna units is compensated for by the phase compensation unit, so that phases of multiple emitted optical signals remain arithmetically distributed, thereby meeting a requirement for far-field imaging.

BRIEF DESCRIPTION OF THE DRAWINGS

One or more embodiments are described by using examples with reference to diagrams in drawings corresponding to the embodiments. These exemplary descriptions do not constitute a limitation to the embodiments. Elements with the same reference numerals in the drawings indicate similar elements. Unless otherwise stated, the diagrams in the drawings do not constitute a proportional limitation.

DETAILED DESCRIPTION

The following describes exemplary embodiments of the present disclosure with more details with reference to the accompanying drawings. Although the exemplary embodiments of the present disclosure are shown in the accompanying drawings, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

Figure 1:
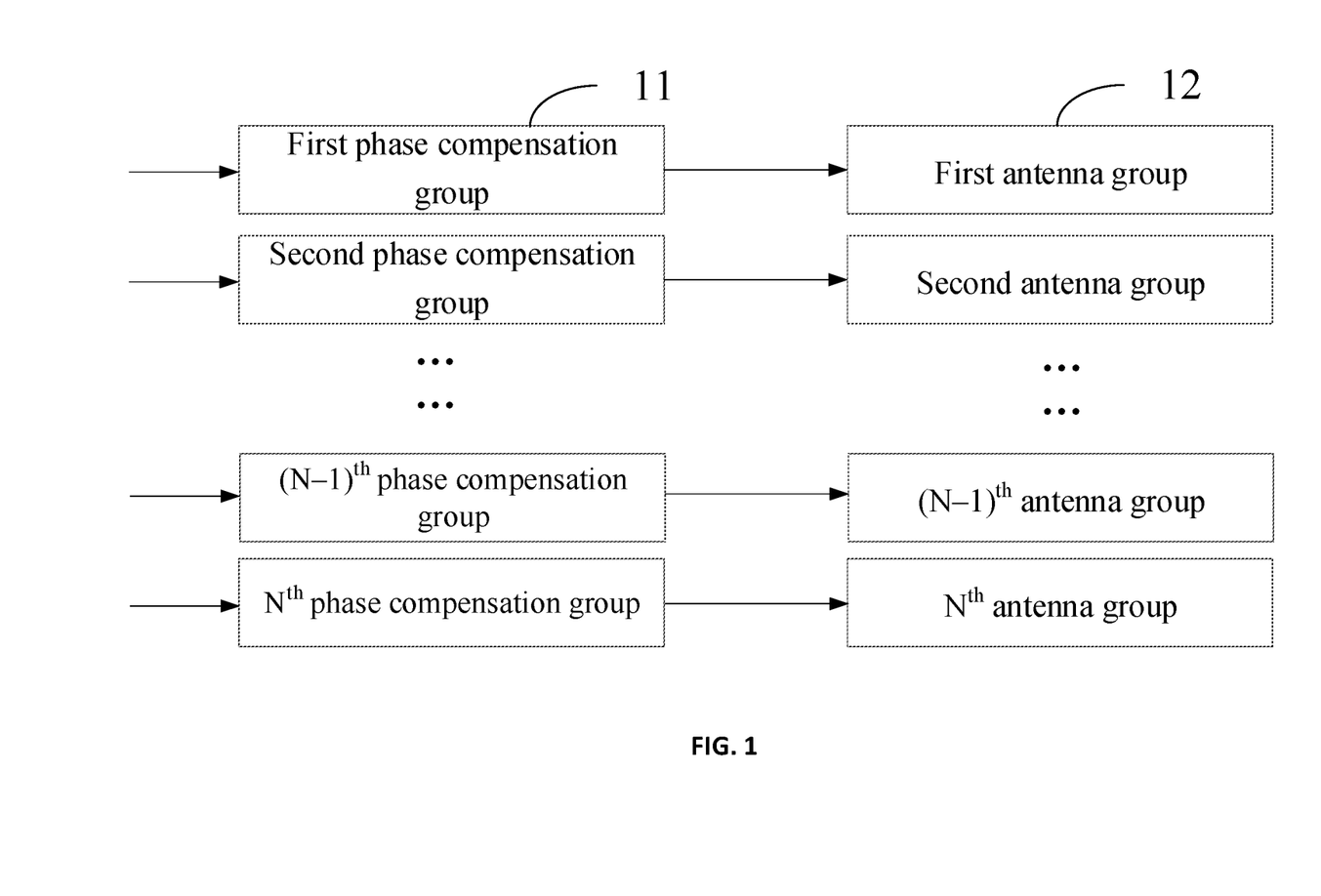
FIG. 1 is a schematic structural diagram of an antenna array applied to an optical phased array according to some embodiments of the present disclosure.
Figure 2:
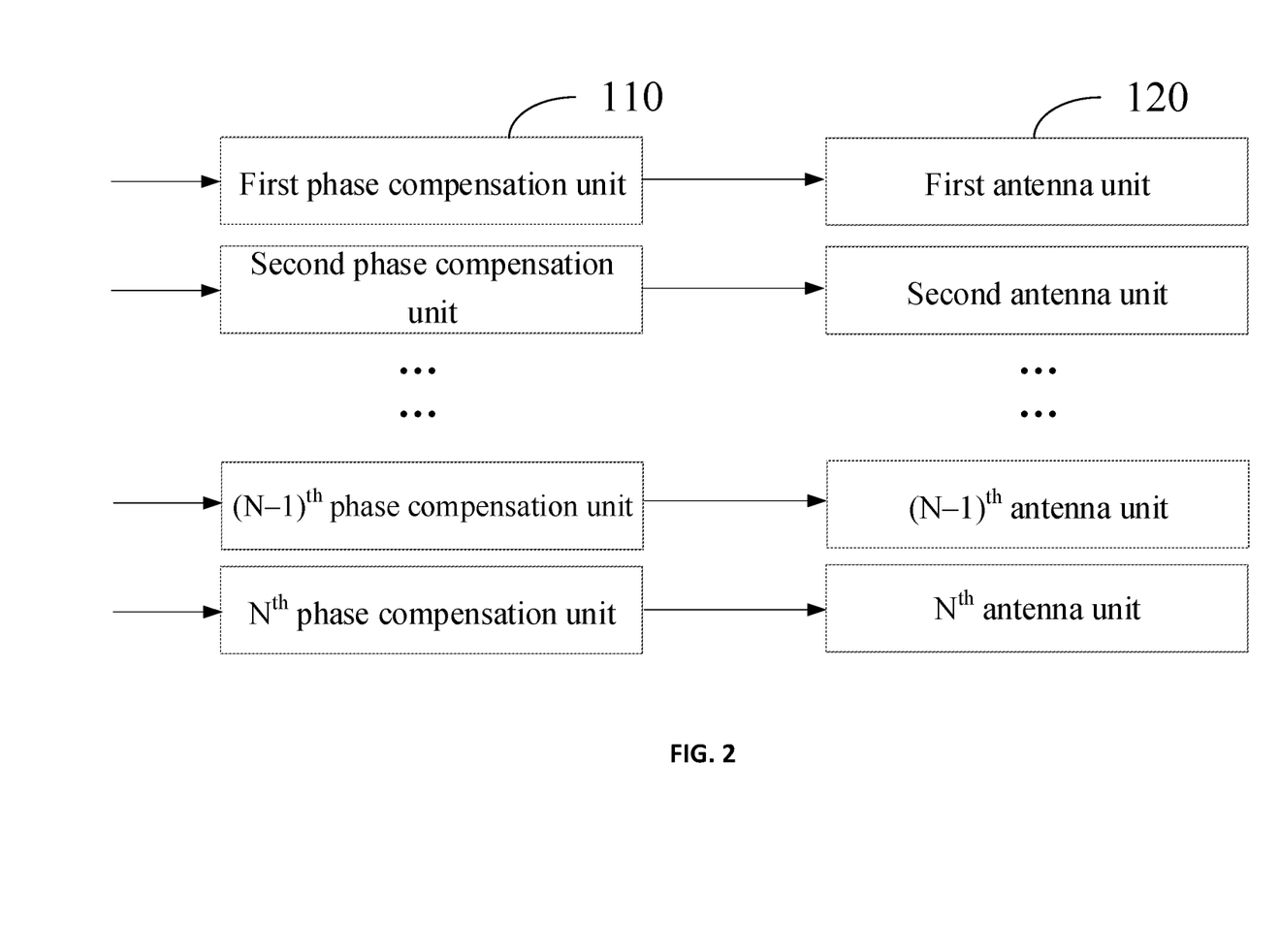
FIG. 2 is a schematic diagram of internal structures of a phase compensation group and an antenna group of an antenna array applied to an optical phased array according to some embodiments of the present disclosure.

FIG. 1 is a schematic structural diagram of an antenna array applied to an optical phased array according to some embodiments of the present disclosure. FIG. 2 is a schematic diagram of internal structures of a phase compensation group and an antenna group of an antenna array applied to an optical phased array according to some embodiments of the present disclosure. As shown in FIG. 1, the antenna array applied to an optical phased array includes N phase compensation groups 11 and N antenna groups 12. Referring to FIG. 2, each phase compensation group 11 includes M phase compensation units 110, and each antenna group 12 includes M antenna units 120, where N and M are positive integers. An input end of a phase compensation unit 110 in the phase compensation group is configured to receive an optical signal. An output end is connected to an antenna unit 120 in the antenna group 12, is configured to transmit the received optical signal to the antenna unit 120, and performs phase compensation on the optical signal based on a phase shift caused by the antenna unit 120. The antenna unit 120 is configured to transmit the optical signal.

In some embodiments of the present disclosure, an ith phase compensation group 11 is connected to an ith antenna group 12. Each phase compensation group 11 can receive M input optical signals, where 1<i<N. General structures of different phase compensation groups 11 are kept consistent. Similarly, general structures of different antenna groups 12 are kept consistent. In any phase compensation group 11 and antenna group 12 connected thereto, a jth phase compensation unit 110 is connected to a jth antenna unit 120, and each phase compensation unit 110 can receive an input optical signal, where 1<j<M. The antenna unit 120 is configured to emit an optical signal, and the phase compensation unit 110 is configured to compensate for a phase difference caused by the antenna unit 120 connected to the phase compensation unit 110.

In some embodiments of the present disclosure, any antenna unit 120 includes a gradually narrowing waveguide mode converter, which can gradually expand a light spot in an antenna waveguide. The waveguide-based mode converter can be a conic waveguide with a gradually decreasing width, or a parabolic waveguide and a waveguide with a similar outline. Specifically, a jth antenna unit 120 in any antenna group 12 includes a waveguide-based mode converter changing gradually from a first width wj to a narrower second width wjt, which is configured to gradually expand a light spot in the waveguide for emission from a tip end. The width of the antenna unit 120 gradually changes from the first width wj to the narrower second width wjt, so that a light spot in each antenna gradually increases and an effective refractive index in the mode decreases and becomes closer to a refractive index of air in free space. Therefore, when the optical signal is emitted, reflection caused by a difference between the refractive index in the antenna mode and the refractive index of the air in the free space is also inhibited, thereby significantly increasing transmission efficiency.

Any phase compensation unit 110 in any phase compensation group 11 can be two conic mode converters with gradually changing widths, and can be in a shape of a bow knot or a similar shape. The internal outline can alternatively be a parabola and a similar curve in addition to a cone. As the width or a length of the phase compensation unit 110 changes, a phase shift is caused to compensate for an additional phase shift caused by the antenna unit 120 connected thereto. Specifically, the phase compensation unit includes a first mode converter whose width gradually changes from a first width wj to a third width wjp, and a second mode converter whose width gradually changes from the third width wjp to the first width wj. An output end of the first mode converter is connected to an input end of the second mode converter, and an output end of the second mode converter is connected to the antenna unit 120. A phase compensation volume of any phase compensation unit 110 depends on how much a value of the third width wjp is changed. In a case that any phase compensation unit 110 in any phase compensation group 11 has a same length L1, the greater a difference |wjp−wj| between the first width wj and the third width wjp of the phase compensation unit 110 is, the greater the phase change caused by the phase compensation unit 110 is.

In some embodiments of the present disclosure, if any antenna unit 120 in any antenna group 12 causes a phase shift of θ, the phase compensation unit 110 whose output terminal is connected to the antenna unit 120 adjusts a difference between the first width wj and the third width wjp, so that the phase compensation unit 110 causes a phase shift of −θ, where θ represents a phase change. Based on the phase difference caused by the antenna unit 120 in the antenna group 12, the third width wjp of the corresponding phase compensation unit 110 connected to the antenna unit 120 can be adjusted to ensure that the phase is compensated. That is, the third width wjp is related to the second width wjt of the antenna unit 120 connected to the output end of the second mode converter, and to a production process of the antenna array. For example, if a jth antenna unit 120 in any antenna group 12 can cause a phase shift of θj, a third width wjp of the jth phase compensation unit 110 connected to the jth antenna unit 120 should be selected to ensure that the phase compensation unit 110 can cause a phase shift of −θj. In this way, a joint phase shift of the two units is zero. If phases of optical signals entering any antenna group are arithmetically distributed, finally emitted light is also arithmetically distributed.

In some embodiments of the present disclosure, antenna units 120 in each antenna group 12 generally have different structures, but antenna units at corresponding locations in different antenna groups have the same structure. For example, a jth antenna unit and a (j−1)st antenna unit in the same antenna group have different structures, but a jth antenna unit in an ith antenna group and a jth antenna unit in an (i−1)th antenna group have the same structure. Specifically, widths of the antenna units are different or the same, and preferably, second widths wjt of the antenna units are different or the same. Correspondingly, phase compensation units in each phase compensation group generally have different structures, and phase compensation units at corresponding locations in the different phase compensation groups have the same structure. Specifically, widths of the phase compensation units are different or the same, and preferably, third widths wjp of the phase compensation units are different or the same.

The antenna array in some embodiments of the present disclosure is generally implemented on a silicon photonic platform with a silicon layer of a thickness of 220 nm. The smaller the second width wjt at an end of the antenna unit 120 is, the closer the effective refractive index in the mode thereof is to the refractive index of the air in the free space, and reflection caused by a difference between the refractive index in the antenna mode and the refractive index of the air in the free space is better inhabited, thereby increasing the transmission efficiency. However, due to limitations of the process, the second width wjt can be set to 100 nm to 300 nm, and preferably, the second width wjt is 200 nm. Compared with a narrower waveguide width, this prevents an end of the antenna from confining the optical signal in the waveguide, thereby enlarging a mode field light spot. A first width wj of any phase compensation unit 110 in the phase compensation group 11 is 300 nm to 500 nm, to prevent a high-order mode from causing unnecessary crosstalk to single-mode transmission. The third width wjp is wj±200 nm, and a change in the waveguide width causes a relatively large change in the refractive index in the mode, that is, a relatively large phase change. In some embodiments of the present disclosure, the third width wjp may be less or greater than the first width wj, and change directions of the two phases are opposite. For example, if the third width wjp is less than the first width wj, the phase is increased; or if the third width wjp is greater than the first width wj, the phase is decreased. A length of any phase compensation unit is 1 μm to 50 μm, and a length of any antenna unit is 1 μm to 50 μm, to ensure a low loss during mode conversion while reducing crosstalk between adjacent waveguides.

Figure 3:
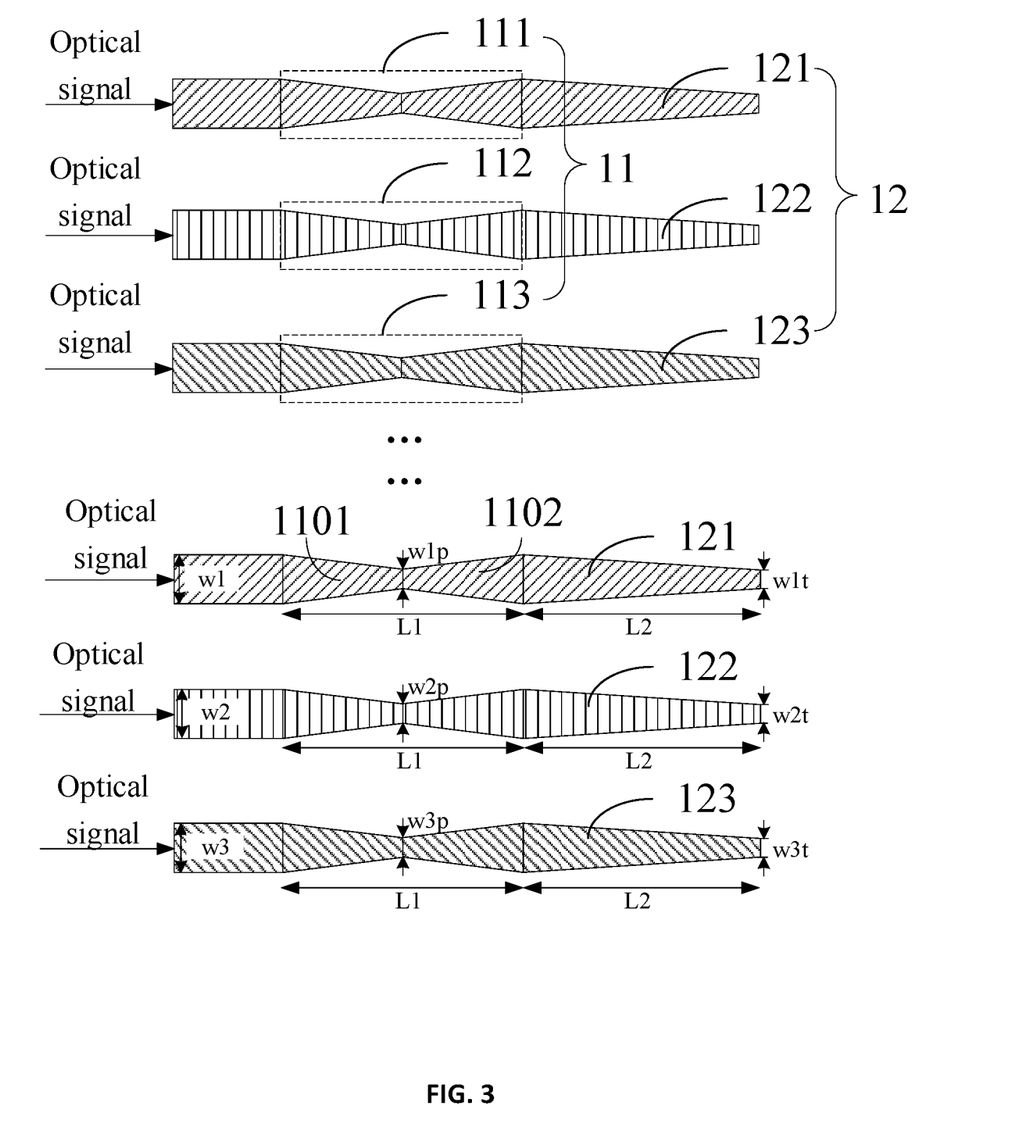
FIG. 3 is a schematic structural diagram of another antenna array applied to an optical phased array according to some embodiments of the present disclosure.

The following uses an example for description, in which the number N of antenna groups is equal to 3 and the number M of antenna units in each antenna group is equal to 3. As shown in FIG. 3, the antenna array includes three antenna groups 12 and three phase compensation groups 11 connected to the three antenna groups 12 respectively. Each antenna group 12 includes a first antenna unit 121, a second antenna unit 122, and a third antenna unit 123. Each phase compensation group includes a first phase compensation unit 111 connected to the first antenna unit 121, a second phase compensation unit 112 connected to the second antenna unit 122, and a third phase compensation unit 113 connected to the third antenna unit 123.

The first antenna unit 121 includes a conic waveguide mode converter whose width gradually changes from a first width w1 to a narrower second width w1t. The first phase compensation unit 111 includes a first mode converter 1101 whose width gradually changes from the first width w1 to a third width w1p, and a second mode converter 1102 whose width gradually changes from the third width w1p to the first width w1. The second antenna unit 122 includes a conic waveguide mode converter whose width gradually changes from a first width w2 to a narrower second width w2t. The second phase compensation unit 112 includes a first mode converter 1101 whose width gradually changes from the first width w2 to a third width w2p, and a second mode converter 1102 whose width gradually changes from the third width w2p to the first width w2. The third antenna unit 123 includes a conic waveguide mode converter whose width gradually changes from a first width w3 to a narrower second width w3t. The third phase compensation unit 113 includes a first mode converter 1101 whose width gradually changes from the first width w3 to a third width w3p, and a second mode converter 1102 whose width gradually changes from the third width w3p to the first width w3.

In some embodiments of the present disclosure, the first widths w1, w2, and w3 are different, the second widths w1t, w2t, and w3t are also different, and the third widths w1p, w2p, and w3p are also different. The first widths w1, w2, and w3 are widths of single-mode waveguides, and can be set to 300 nm to 500 nm. The third widths w1p, w2p, and w3p can be set to 100 nm to 300 nm due to limitations of processes. The second width w1t depends on a phase shift caused by the first antenna unit 121, the second width w2t depends on a phase shift caused by the second antenna unit 122, and the second width w3t depends on the phase shift caused by the third antenna unit 123.

The first antenna unit 121, the second antenna unit 122, and the third antenna unit 123 have the same length L2. The first phase compensation unit 111, the second phase compensation unit 112, and the third phase compensation unit 113 can have the same length or different lengths. This may be specifically set based on a need.

The antenna array in some embodiments of the present disclosure can be applied to a silicon-based CMOS process, which helps implement an antenna array of a larger scale.

In some embodiments of the present disclosure, an antenna array applied to an optical phased array, including N phase compensation groups and N antenna groups, where each phase compensation group includes M phase compensation units, and each antenna group includes M antenna units, and where N and M are positive integers. An input end of any phase compensation unit is configured to receive an optical signal. An output end is connected to an antenna unit in the antenna group, and is configured to transmit the received optical signal to the antenna unit, and compensates for a phase difference caused by the antenna unit. The antenna unit is configured to transmit the optical signal. Therefore, reducing the width of the antenna unit can enlarge a size of the light spot emitted by the antenna, thereby reducing reflection from an ambient environment and improving transmission efficiency. A phase difference caused by different antenna units is compensated for by the phase compensation unit, so that phases of multiple emitted optical signals remain arithmetically distributed, thereby meeting a requirement for far-field imaging.

Figure 4:
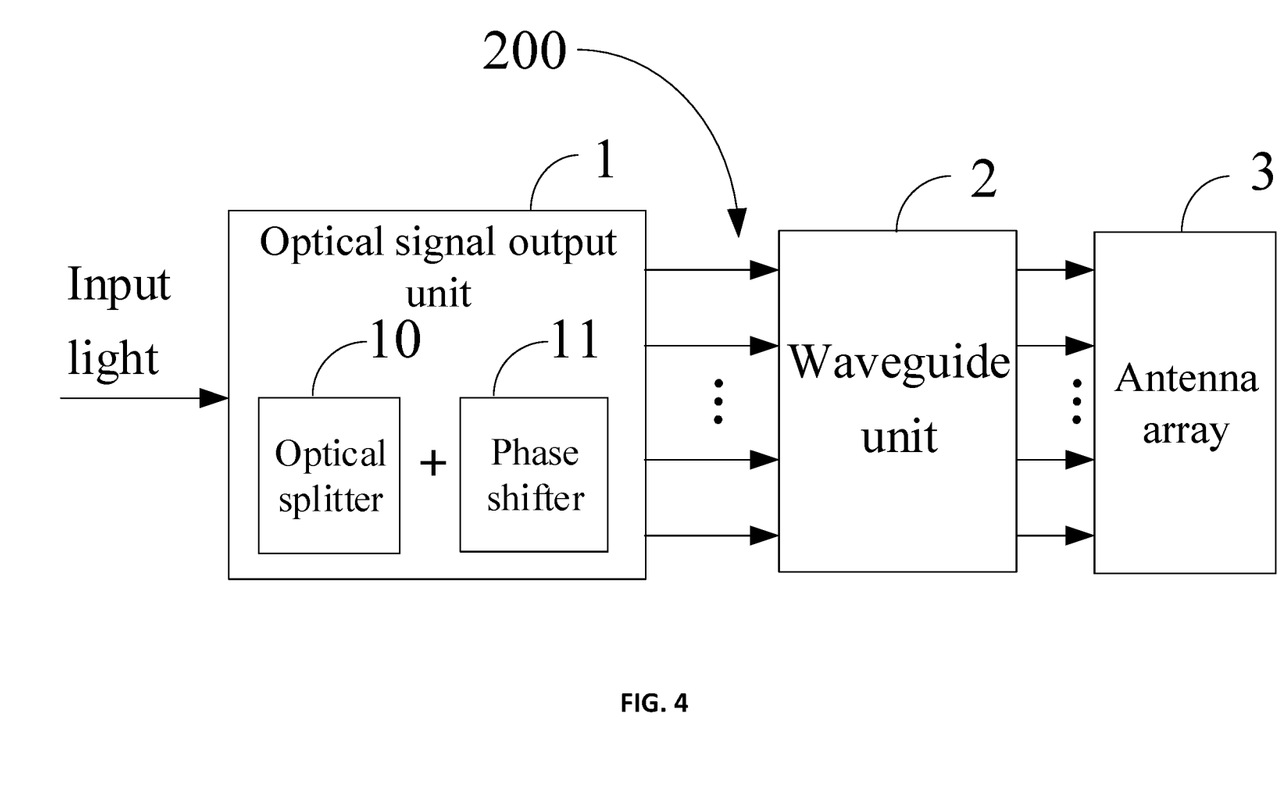
FIG. 4 is a schematic structural diagram of an optical phased array according to some embodiments of the present disclosure.

As shown in FIG. 4, some embodiments of the present disclosure further disclose an optical phased array, including an optical signal output unit 1, a waveguide unit 2, and the foregoing antenna array 3 applied to an optical phased array. The optical signal output unit 1 is configured to output N×M modulated optical signals. The waveguide unit 2 includes N×M waveguide pipes 200 and is configured to transmit the N×M modulated optical signals to the antenna array 3 for transmitting the optical signals.

The optical signal output unit 1 includes an optical splitter 10 and a phase shifter 11 connected to the optical splitter 10. The optical splitter 10 is configured to split input light. The phase shifter 11 is configured to shift a phase of light split by the optical splitter 10 and finally outputs N×M optical signals with different phases. In some embodiments of the present disclosure, the optical splitter 10 may first split input light, and then the phase shifter 11 shifts phases of the light split by the optical splitter 10 to obtain and output a plurality of optical signals of different phases. It is also possible that the optical splitter 10 and the phase shifter 11 are alternately disposed, that is, the input light is split and phase-shifted alternately, to finally output a plurality of optical signals of different phases. After the optical splitter 10 and the phase shifter 11 split and phase-shift the input light respectively, the N×M optical signals of the different phases are output. The waveguide unit 2 receives the N×M optical signals carrying different phase information that are output after being split and phase-shifted by the optical splitter 10 and the phase shifter 11. M output ends of the waveguide unit 2 and N×M input ends of the antenna array 3 are connected.

To ensure that a far-field light spot can be formed in a far field in the free space after these optical signals are emitted from an end of the antenna array 3, phases of these optical signals need to be arithmetically distributed. To reduce complexity and power consumption of a phase-shift zone, a cascaded phase-shift method can be used in the phase-shift zone, and as a result, a phase of each antenna cannot be independently adjusted, and only arithmetically distributed phases can be provided. If the antenna arrays are different, some additional phase differences that cannot be completely adjusted in a method of dynamically adjusting the phase-shift zone may be caused. Therefore, a phase compensation group needs to be designed in the antenna array 3 to compensate for an additional phase shift caused by the antenna group.

The antenna array 3 includes N phase compensation groups and N antenna groups. Each phase compensation group can receive M input optical signals from the waveguide unit 2 and transmit the M input optical signals to an antenna group correspondingly connected to the phase compensation group. The antenna group is configured to emit the optical signals, and the phase compensation group is configured to compensate for the phase shift caused by the antenna group correspondingly connected to the phase compensation group. For a more specific structure and working principle of the antenna array 3, reference may be made to the antenna array in the foregoing embodiments. Details are not described herein again.

Some embodiments of the present disclosure further discloses a LiDAR, including an optical phased array, a light receiving unit, and a ranging unit. The optical phased array is configured to emit a laser. The light receiving unit is configured to receive a laser signal reflected by an object. The ranging unit is configured to perform ranging based on the laser signal received by the light receiving unit. A specific structure and a working principle of the optical phased array in some embodiments of the present disclosure are the same as those of the optical phased array in the foregoing embodiments. Details are not described herein again.

Some embodiments of the present disclosure further discloses an intelligent apparatus, including a LiDAR. A specific structure and a working principle of the LiDAR are the same as those of the LiDAR in the foregoing embodiments. Details are not described herein again.

In some embodiments of the present disclosure, an antenna array applied to an optical phased array, including N phase compensation groups and N antenna groups, where each phase compensation group includes M phase compensation units, and each antenna group includes M antenna units, and where N and M are positive integers. An input end of any phase compensation unit is configured to receive an optical signal. An output end is connected to an antenna unit in the antenna group, is configured to transmit the received optical signal to the antenna unit, and compensates for a phase difference caused by the antenna unit. The antenna unit is configured to transmit the optical signal. Therefore, reducing the width of the antenna unit can enlarge a size of the light spot emitted by the antenna, thereby reducing reflection from an ambient environment and improving transmission efficiency. A phase difference caused by different antenna units is compensated for by the phase compensation unit, so that phases of multiple emitted optical signals remain arithmetically distributed, thereby meeting a requirement for far-field imaging.

In the specification provided here, a lot of specific details are described. However, it can be understood that embodiments of the present disclosure can be practiced without these specific details. In some instances, common methods, structures, and technologies are not shown in detail, so as not to obscure the understanding of this specification.

Similarly, it should be understood that to streamline this disclosure and help understand one or more of the various inventive aspects, in the foregoing description of the exemplary embodiments of the present disclosure, the various features of the present disclosure are sometimes grouped together into a single implementation, example, diagram, or description. However, the disclosed method should not be interpreted as reflecting the intention that the claimed invention requires more features than those explicitly stated in each claim. More precisely, as reflected in the following claims, the inventive aspect is less than all the features of a single embodiment disclosed previously. Therefore, the claims following the specific embodiment are thus explicitly incorporated into the specific embodiment, where each claim itself serves as a separate embodiment of the present disclosure.

The person skilled in the art can understand that it is possible to adaptively change the modules in a device in the embodiment. The modules can be arranged in one or more devices different from the embodiment. The modules or units or assemblies in the embodiments can be combined into one module or unit or assembly. In addition, the modules or units or assemblies can be divided into a plurality of sub-modules or sub-units or sub-assemblies.

Except that at least some of such features and/or processes or units are mutually exclusive, any combination can be configured to apply any combination to all features disclosed in this specification (including the accompanying claims, abstract and drawings) and all the processes or units of any method or the apparatus disclosed in this manner. Unless expressly stated otherwise, each feature disclosed in this specification (including the accompanying claims, abstract and drawings) can be replaced by an alternative feature that serves the same, equivalent or similar objective.

In addition, a person skilled in the art can understand that although some embodiments described herein include some features included in other embodiments instead of other features, a combination of features in different embodiments means that the features fall within the scope of the present disclosure and form different embodiments. For example, in the following claims, any one of the claimed embodiments can be used in any combination.

It should be noted that the foregoing embodiments illustrate rather than limit the present disclosure, and the person skilled in the art can design alternative embodiments without departing from the scope of the appended claims. In the claims, any reference signs positioned between parentheses should not be constructed as a limitation to the claims. The word "including" does not exclude the presence of elements or steps not listed in the claims. The word "a" or "an" in front of an element does not exclude the presence of a plurality of such elements. The application can be implemented by means of hardware comprising a plurality of different elements and by means of a suitably programmed computer. In the unit claims enumerating a plurality of devices, a plurality of these devices can be embodied by the same hardware item. The use of the words "first, second, and third", etc. do not indicate any order. These words can be interpreted as names.

What is claimed is:

1. An antenna array applied to an optical phased array, comprising:
    N phase compensation groups and N antenna groups, wherein an $i^{th}$ phase compensation group is connected to an $i^{th}$ antenna group, where $1<i<N$,
    each phase compensation group comprises M phase compensation units, and each antenna group comprises M antenna units, a $j^{th}$ phase compensation unit is connected to a $j^{th}$ antenna unit, where $1<j<M$, N and M are positive integers, and
    wherein an input end of a phase compensation unit in one of the N phase compensation groups is configured to receive an optical signal,
    wherein an output end of the phase compensation unit is connected to an antenna unit in one of the N antenna groups, is configured to transmit the received optical signal to the antenna unit, and performs phase compensation on the optical signal based on a phase shift caused by the antenna unit,
    wherein the antenna unit is configured to transmit the optical signal, and comprises a waveguide-based mode converter changing gradually from a first width to a second width, the first width is larger than the second width, the antenna unit is configured to gradually expand a light spot in the waveguide for emission from a tip end; and
    wherein the phase compensation unit comprises a first mode converter whose width gradually changes from the first width to a third width, and a second mode converter whose width gradually changes from the third width to the first width, the first width is larger than the third width, an output end of the first mode converter is connected to an input end of the second mode converter, and an output end of the second mode converter is connected to the antenna unit.

2. The antenna array according to claim 1, wherein the third width is related to the second width of the antenna unit connected to the output end of the second mode converter, and to a production process of the antenna array.

3. The antenna array according to claim 1, wherein in response to that a second antenna unit in one of the N antenna groups causes a phase shift of $\theta$, a second phase compensation unit whose output terminal is connected to the second antenna unit adjusts a difference between the first width and the third width, so that the second phase compensation unit causes a phase shift of $-\theta$, wherein $\theta$ represents a phase change.

4. The antenna array according to claim 1, wherein a first width wj of any phase compensation unit in one of the N phase compensation groups is 300 nm to 500 nm, and a third width wjp is wj±200 nm.

5. The antenna array according to claim 1, wherein a length of any phase compensation unit is 1 µm to 50 µm, and a length of any antenna unit is 1 µm to 50 µm.

6. An optical phased array, comprising an optical signal output unit, a waveguide unit, and an antenna array applied to an optical phased array according to claim 1, wherein the optical signal output unit is configured to output N×M modulated optical signals, and
    wherein the waveguide unit comprises N×M waveguide pipes and is configured to transmit the N×M modulated optical signals to the antenna array for transmitting the optical signals.

7. The optical phased array according to claim 6, wherein the optical signal output unit comprises an optical splitter and a phase shifter connected to the optical splitter,
    wherein the optical splitter is configured to split input light, and
    wherein the phase shifter is configured to shift a phase of light split by the optical splitter and outputs N×M optical signals with different phases.

* * * * *